Oct. 7, 1969     A. J. TELLER     3,470,811

STORAGE BUILDING

Filed Feb. 5, 1968

INVENTOR
AARON J. TELLER

BY *McLean, Morton & Boustead*

ATTORNEYS

United States Patent Office 3,470,811
Patented Oct. 7, 1969

3,470,811
STORAGE BUILDING
Aaron J. Teller, Great Neck, N.Y., assignor to Wellman-Lord, Inc., a corporation of Florida
Filed Feb. 5, 1968, Ser. No. 703,126
Int. Cl. F24f 13/00
U.S. Cl. 98—33                                10 Claims

ABSTRACT OF THE DISCLOSURE

A building for storing material which requires ventilation to prevent accumulation of noxious fumes. The building includes an imperforate roof supported by vertical walls, at least one of which has a doorway for entry of men, material, and handling equipment. An air collection duct extends horizontally along the wall opposite the wall having an opening which can be provided by a doorway, for instance. Under urging of a blower or other suitable means, air enters an opening, e.g. doorway, or a duct distributor mounted along the wall in which the doorway is placed, flows over the stored material into the air collection duct, bringing with it the noxious fumes. The air can be passed through air treating equipment prior to being exhausted into the atmosphere.

---

Figure 1:
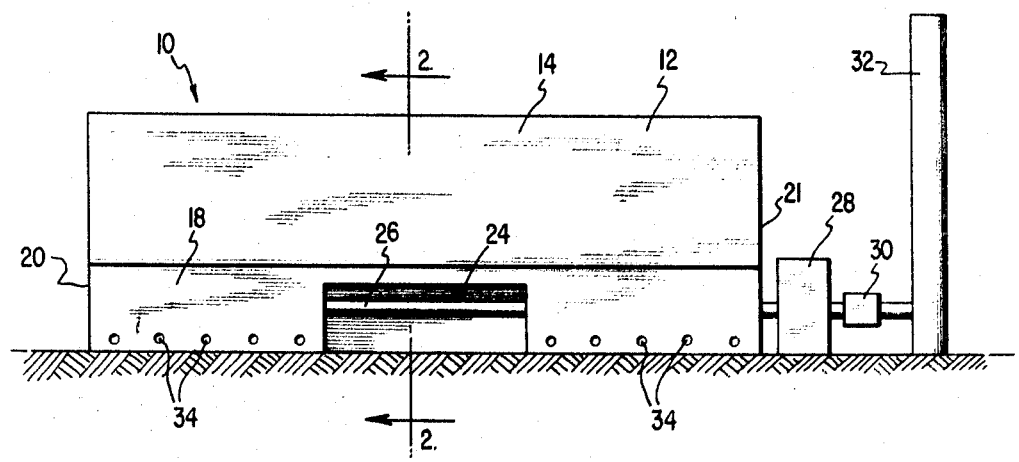

This invention pertains to a storage building. More particularly this invention pertains to a building for storing materials which emit noxious fumes in an environment which provides improved ventilation of such stored materials to insure a safe operating atmosphere for personnel working with the materials in the building.

Many materials emit noxious fumes when stored for substantial periods of time. To protect the health of people working in the building in which such materials are stored, proper ventilation of the storage building is required. In addition, too great a concentration of some types of fumes presents a fire hazard, and so again proper ventilation of the storage building is required as a safety measure.

One type of building in use for storing materials which emit noxious fumes provides openings in the building roof near the top of the building. Such a construction relies upon the natural convection movement of the air within the building to cause air circulation from the bottom of the building to the top in an uncontrolled manner. This construction does not assure adequate ventilation of the building to insure that the concentration of noxious fumes within the building does not reach a lever which presents a hazard to health and safety. In addition, the movement of air in the biulding engulfs personnel, particularly those working with the material, in noxious fumes.

Another type of building construction utilized in storage buildings includes openings in the walls of the building near the ground lever, as well as openings in the roof near the top of the building. A typical building of this type is disclosed in U.S. Patent No. 1,903,510, issued Apr. 11, 1933 to John F. Laboon and Frederick B. Barns. Again, natural air currents are relied upon to carry noxious fumes from the building. Even if means such as fans are added to increase the ventilation, the building is not wholly satisfactory because of the large volume of air drawn into and exhausted from the building. If the fumes which are emitted from the building are to be treated to remove noxious components prior to discharge into the atmosphere, the large quantity of air emitted from such a building necessitates treatment equipment capable of handling large volumes.

Material is generally loaded into a storage building through an overhead conveyer or a doorway and is removed from the building through a doorway on one side of the building. Thus, in loading material into the building, the material is first placed in the building adjacent the wall of the building opposite the doorway or along the centerline of the building. The convection air currents, resulting from movement of air from openings in the building walls near the ground towards openings in the top of the building, cause air circulation to the top of the building both from the side of the building on which the doorway is located and from the side of the building opposite the doorway. Personnel who are within the building loading and unloading material only work on the side nearer the doorway. There is thus no requirement on the side of the building opposite the doorway for fresh air for breathing by personnel; although it is required that the air on that side of the building not acquire so high a concentration of noxious materials that a fire or other safety hazard exists. Thus, on the side of the building opposite the doorway, it is required that ventilation insure that noxious components in the air do not reach an unsafe level, but it is not required that the ventilation provide fresh air for breathing.

The present invention is a storage building in which air is caused to flow from one side of the building, over the material stored within the building, and out the other side of the building. No openings are provided at the top of the building. Means such as a blower is provided to cause the air to flow essentially in one direction through the building. Thus, fresh air is advantageously brought into the building on the side on which personnel are working and passes over the backs of these personnel with zero or minimal concentration of noxious components. This air flows over the material within the building and into an air collection duct on the opposite side of the building, carrying with it the noxious fumes. The air from the collection duct can be advantageously passed to suitable air treatment equipment in which desirable components in the air can be recovered prior to discharge into the atmosphere. Since air only enters one side of the building, the quantity of air used for ventilation purposes is considerably reduced, thereby simplifying the treatment of exhaust air, while at the same time effectively removing noxious components. Consequently less elaborate air treatment equipment is required, and the capital cost of the building is significantly reduced. The building doorway and ducts with louvre distributors along the doorway side of the building may be used in conjunction as an air entrance, thereby insuring that personnel entering the building have an ample supply of fresh air.

The storage building of the present invention is particularly useful in providing an environment for handling materials, e.g. acidic fertilizer such as triple superphosphate and granular triple superphosphate which contain residual amounts of unreacted phosphoric acid, the acid provided by the wet process. The unreacted acid continues to react over several months, e.g. 2 months, and a pile of fertilizer material in storage may continue to emit products of reaction such as silicon tetrafluoride and small amounts of hydrogen fluoride in the form of noxious fumes over this period. In fact, the center of such a fertilizer pile can have a temperature as much as 100° F. higher than ambient temperatures as a result of such continuing reaction. The fertilizer pile emits increased volumes of noxious fumes when agitated, e.g. digging into a pile of the material to remove portions of it from the storage area for use. Such agitation lays open previously masked areas of the material, and increased volumes of noxious fumes, which can be deleterious to personnel handling the material, are released and in this environment are drawn away from the personnel in a simple and efficient manner.

Figure 2:
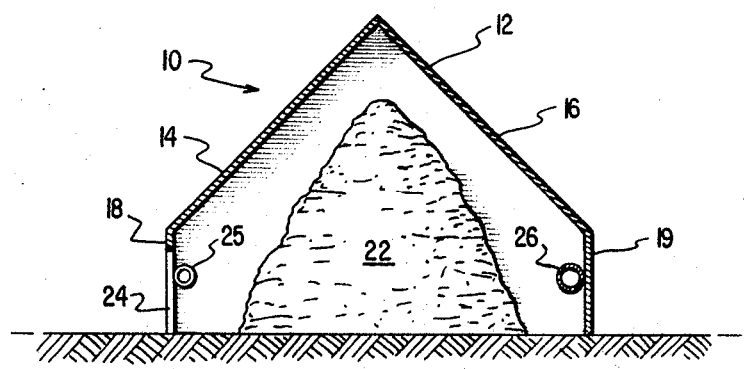

These and other aspects and advantages of the present invention are apparent in the following detailed description and claims, particularly when read in conjunction with the accompanying drawings in which like parts bear like reference numerals. In the drawings:

FIGURE 1 is a front elevation view of the storage building of the present invention; and FIGURE 2 is a sectional elevation view of the storage building of the present invention taken along line 2—2 of FIGURE 1.

Storage building 10 includes roof 12 having sloping sides 14 and 16 supported on front wall 18, rear wall 19, and end walls 20 and 21. In FIGURE 2 there is depicted by way of illustration a pile of material 22, which for example might be fertilizer, stored within building 10. Front wall 18 includes a doorway 24 for entry of men, material and handling equipment into building 10. Diffusor air duct 25 extends horizontally along wall 18, and air collection duct 26 extends horizontally along rear wall 19. By way of example, diffusor duct 25 and collection duct 26 might each be an air duct having a plurality of vents or louvres for controlling the flow of air out of and into them, such as the ducts commonly found in a home heating system.

Air entering building 10 through doorway 24 and air diffusor 25 flows over pile of material 22, and enters air collection duct 26, carrying with it the noxious fumes which have been emitted by the material and which are in the air in the vicinity of the stored material. If desired, the air and noxious fumes can then be passed through air treating equipment 28 in which the noxious components are substantially removed. The particular equipment which might be used as treating equipment 28 depends to some extent upon the material stored within building 10 and the particular noxious components which that material introduces into the air. Thus, for example, if the material 22 is fertilizer, it might emit substantial quantities of fluorine constituents, and treating unit 28 might be an air washer which removes the fluorine components from the air. Typical air washers are disclosed in U.S. Patents Nos. 2,867,425, 3,006,436, 3,183,649, and 3,324,630.

Means such as blower 30 are utilized to aid the flow of air and noxious fumes. Preferably the air and noxious fumes pass through treating unit 28 prior to blower 30 so that corrosive elements which might otherwise have a deleterious effect on blower 30 are first removed. The noxious components can be recovered from treating unit 28 for further use. From blower 30 the air is passed to exhaust stack 32 which exhausts it into the atmosphere.

Walls 18, 19, 20 and 21 are relatively low, in the order of about 15 to 20 feet in height as commonly found in storage buildings. Since roof 12 is imperforate, there is no opening near the top of building 10, and so air is permitted to flow only from the entrance 24 over the material 22 to collection duct 26. The air sweeps through the building and over the material 22 in a manner which efficiently ventilates building 10. Air collection duct 26 is located near the ground, preferably at a height no greater than about 12 feet above the ground. As a result the air is drawn completely behind material 22, insuring ventilation of all areas of building 10. Consequently a small volume of air is able to reduce the concentration of noxious components within building 10 to a level which presents no safety hazard at any location in the building. In addition, since the fresh air enters the building from the side on which personnel are working, an adequate supply of fresh air is always available to insure that no health hazard is present for these personnel.

The air sweeping through doorway 24 forms an air curtain which prevents noxious fumes from passing out the doorway while allowing easy access to building 10 for personnel and equipment. Blower 30 causes a slight negative pressure in building 10, and this insures that noxious fumes do not leak from the building. If desired, e.g. for security when no personnel are at building 10, doorway 24 might be closed by means of a door (not shown), in which case, openings 34 or diffusor duct 25 can be included in front wall 18 to provide adequate ventilation. Openings 34 might include means (not shown) for closing them when doorway 24 is open to aid the air curtain formed at doorway 24.

In a building constructed in accordance with the present invention, adequate ventilation can be achieved with an air volume only ⅓ to ½ as great as required in a building dependent for ventilation upon convection of air. Because of this reduced air volume, the concentration of toxic gases in the exhaust stream is two to three times greater than with a convection system, thus permitting use of smaller and more efficient exhaust air treatment equipment.

Although the present invention has been described with reference to a preferred embodiment, numerous modifications and rearrangements might be made, and still the resulting building would be within the scope of the invention which is defined by the claims.

What is claimed is:

1. A process of ventilating stored material to reduce the concentration of noxious fumes in the vicinity of the stored material comprising placing the material within an enclosed storage area having an air entrance on one side only; drawing air through the air entrance, over the stored material, and into an air collector within the storage area and only on the side of the material opposite the air entrance to move noxious fumes from the vicinity of the stored material into the air collector with the drawn air; passing the drawn air and noxious fumes through an air treater to reduce the concentration of noxious fumes in the air; and exhausting from the air treater air from which the concentration of noxious fumes has been substantially reduced.

2. The process of claim 1 wherein the storage area includes a working area for handling of the material by personnel and located in the area of the material near the air entrance.

3. The process of claim 2 including drawing air into the storage area through an air entrance located near the bottom of the storage area.

4. A storage building comprising vertical front and rear walls, said front wall having air passageway openings therethrough, at least some of said openings disposed along the length of said front wall; enclosure wall means joining said front and rear walls to enclose a storage area for fume emitting materials; an imperforate roof supported by said walls and covering said storage area; an air diffusor duct disposed along said front wall, an air collection duct within said storage building and disposed along said rear wall to collect air introduced through the air passageway openings; means for urging air introduced through the passageway openings over the storage area and into the air collection duct; an air scrubber coupled to the air collection duct; and exhaust means connected to said air scrubber for exhausting air to the atmosphere.

5. A storage building comprising vertical front and rear walls, said front wall having air passageway openings therethrough; enclosure walls means joining said front and rear walls to enclose a storage area for fume emitting materials; an imperforate roof supported by said walls and covering said storage area; air collection means within said storage building and disposed along said rear wall to collect air introduced through the air passageway openings; at least some of said air passageway openings being disposed along said front wall at a height substantially less than the height of said air collection means; and means for urging air introduced through the passageway openings over the storage area and into the air collection means.

6. A storage building as claimed in claim 5 further including air treatment means coupled to the air collection means.

7. A storage building as claimed in claim 6 further including exhaust means connected to said air treatment means for exhausting air to the atmosphere.

8. A storage building as claimed in claim 6 in which said air passageway openings include a building doorway.

9. A storage building as claimed in claim 8 further comprising an air diffusor duct disposed along said front wall.

10. A storage building as claimed in claim 6 in which said air treatment means is an air scrubber.

References Cited

UNITED STATES PATENTS

| | | | |
|---|---|---|---|
| 2,710,574 | 6/1955 | Runion | 98—33 X |
| 3,052,176 | 9/1962 | Anderson | 98—33 |
| 3,352,225 | 11/1967 | Ffiske | 98—33 |

LLOYD L. KING, Primary Examiner